United States Patent
Diaz et al.

(10) Patent No.: US 8,693,169 B2
(45) Date of Patent: Apr. 8, 2014

(54) PANELBOARD PLUG-ON NEUTRAL BUS AND METHOD OF MAKING SAME

(75) Inventors: Mauricio Diaz, San Nicolas de los Garza (MX); Hildegard Peralta, Monterrey (MX); Ezequiel Salas, Monterrey (MX)

(73) Assignee: Schneider Electric USA, Inc., Palatine, IL (US)

( * ) Notice: Subject to any disclaimer, the term of this patent is extended or adjusted under 35 U.S.C. 154(b) by 272 days.

(21) Appl. No.: 13/333,016

(22) Filed: Dec. 21, 2011

(65) Prior Publication Data

US 2013/0164961 A1    Jun. 27, 2013

(51) Int. Cl.
*H02B 1/04* (2006.01)
*H02B 1/20* (2006.01)

(52) U.S. Cl.
USPC ........... 361/634; 361/627; 361/628; 361/631; 361/633; 361/636; 361/637; 361/639; 361/640; 361/643; 361/673

(58) Field of Classification Search
None
See application file for complete search history.

(56) References Cited

U.S. PATENT DOCUMENTS

| | | | |
|---|---|---|---|
| 2,902,632 A | | 9/1959 | Stanback et al. |
| 5,439,396 A * | | 8/1995 | Magdaleno ................ 439/716 |
| 5,486,979 A * | | 1/1996 | Bowen et al. .............. 361/640 |
| 5,761,026 A * | | 6/1998 | Robinson et al. ............ 361/627 |
| 5,768,091 A * | | 6/1998 | Vinson et al. .............. 361/601 |
| 5,943,207 A * | | 8/1999 | Kim .......................... 361/673 |
| 6,560,123 B1 * | | 5/2003 | de Varennes et al. ........ 361/807 |
| 6,806,799 B2 * | | 10/2004 | Runyan ......................... 335/6 |
| 7,403,373 B2 * | | 7/2008 | McCoy et al. .............. 361/673 |
| 7,449,645 B1 | | 11/2008 | Flegel |
| 7,508,653 B2 | | 3/2009 | Parlee |
| 7,540,790 B2 * | | 6/2009 | Weber et al. ............... 439/716 |
| 7,679,887 B2 * | | 3/2010 | Adunka et al. .............. 361/673 |
| 7,813,110 B1 * | | 10/2010 | Rezac ....................... 361/624 |
| 7,957,122 B2 | | 6/2011 | Sharp |
| 2008/0158787 A1 | | 7/2008 | Parlee |
| 2011/0002089 A1 | | 1/2011 | Sharp |

OTHER PUBLICATIONS

International Search Report corresponding to co-pending International Patent Application Serial No. PCT/US2012/069269, European Patent Office, dated Mar. 21, 2013; (4 pages).
International Written Opinion corresponding to co-pending International Patent Application Serial No. PCT/US2012/069269, European Patent Office, dated Mar. 21, 2013; (7 pages).

* cited by examiner

*Primary Examiner* — Boris Chervinsky
(74) *Attorney, Agent, or Firm* — Locke Lord LLP

(57) ABSTRACT

A loadcenter is equipped with a unitary neutral bus bar capable of receiving AFI and GFI circuit breakers having either a plug-on-neutral connection or a wire-neutral connection. The neutral bus bar is connected to line neutral and has a rolled rail that is formed by rolling an end of a conductive plate and bending the plate at a transition portion to position the rolled rail above and at an angle of a major flat surface of an extension of the neutral bus bar. Wire-capture apparatuses secured along an edge of an extension of the neutral bus bar can capture wires from circuit breakers that lack an internal connection to a neutral plug-on mounting jaw or that lack a neutral plug-on mounting jaw altogether.

19 Claims, 6 Drawing Sheets

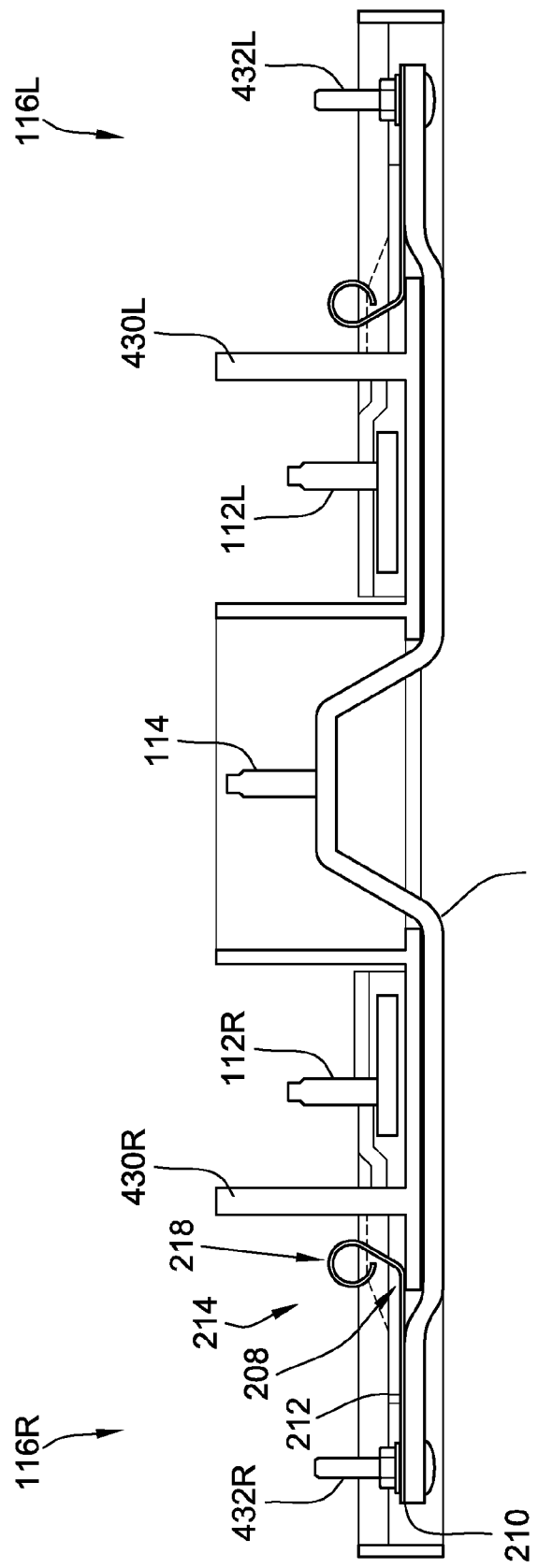

PANELBOARD PLUG-ON NEUTRAL BUS AND METHOD OF MAKING SAME

FIELD OF THE INVENTION

The present invention relates to electrical distribution panels, or loadcenters, and to a neutral bus for use in the same.

BACKGROUND OF THE INVENTION

Arc-fault interruption (AFI) and ground-fault interruption (GFI) circuit breakers are well known. Such circuit breakers have traditionally required an extra conductor, called a "pigtail," to connect the breaker to a line-side neutral conductor of an electrical distribution panel or loadcenter (these terms are used interchangeably herein). Increased use of arc-fault circuit breakers in a residential loadcenter results in additional pigtails crowding the wiring gutter of the loadcenter, making it more difficult to wire as more circuit breakers are added and creating a jumble of wires that can lead to wiring mistakes or installation confusion.

More recently, AFI and GFI circuit breakers feature a "plug-on neutral," which replaces the pigtail, and allows the circuit breaker to be "plugged onto" the neutral bus bar directly. Instead of a pigtail, the circuit breaker has a connector called a mounting jaw that directly plugs onto the neutral conductor in the electrical distribution panel. The mounting jaws typically face downward away from a bottom surface of the circuit breaker so that they are oriented to be plugged directly onto a neutral conductor in the panel or loadcenter. However, certain disadvantages remain. Distribution panels must have a neutral rail to accommodate plug-on-neutral circuit breakers as well as a separate neutral connection bar to accommodate pigtail-neutral circuit breakers because both circuit breaker types are widely used. In the case of one known panel, the neutral conductor for pigtail connections is located above the circuit breakers. This leads to wiring difficulties because all wire connections to line-side neutral are made in a small area and the pigtail circuit breakers are preferably mounted at the locations closest to the neutral conductor. In the case of another known panel, the neutral connection bar extends down a side of the distribution panel in addition to the neutral rail. This configuration leads to additional material being used in the construction of the distribution panel.

BRIEF SUMMARY OF ASPECTS OF THE INVENTION

Aspects of the present disclosure are directed to electrical distribution panels and a neutral bus that eliminates the use of separate pieces to connect pigtail-neutral circuit breakers and plug-on-neutral circuit breakers to line neutral. In an embodiment, a rolled rail is formed by rolling the end of a rectangular plate. The rolled end provides a location for securely mounting all types of circuit breakers. Mounting a plug-on-neutral circuit breaker completes an electrical connection to line neutral. Wire-capture apparatuses are located along the edge of the plate opposite the rolled end and provide a convenient connection point to line neutral for a pigtail-neutral circuit breaker mounted at any location along the rolled rail, reducing clutter in the wire gutter. Advantageously, wiring difficulty and clutter are further reduced because a load neutral connection that does not need to be attached to a specific circuit breaker may be attached to any unused, convenient wire-capture apparatus.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 4 is an end or top view of the electrical distribution panel of FIG. 1, showing an electrical connection between the neutral bus bars and a line-side neutral bar that receives line-side neutral from outside the panel;

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
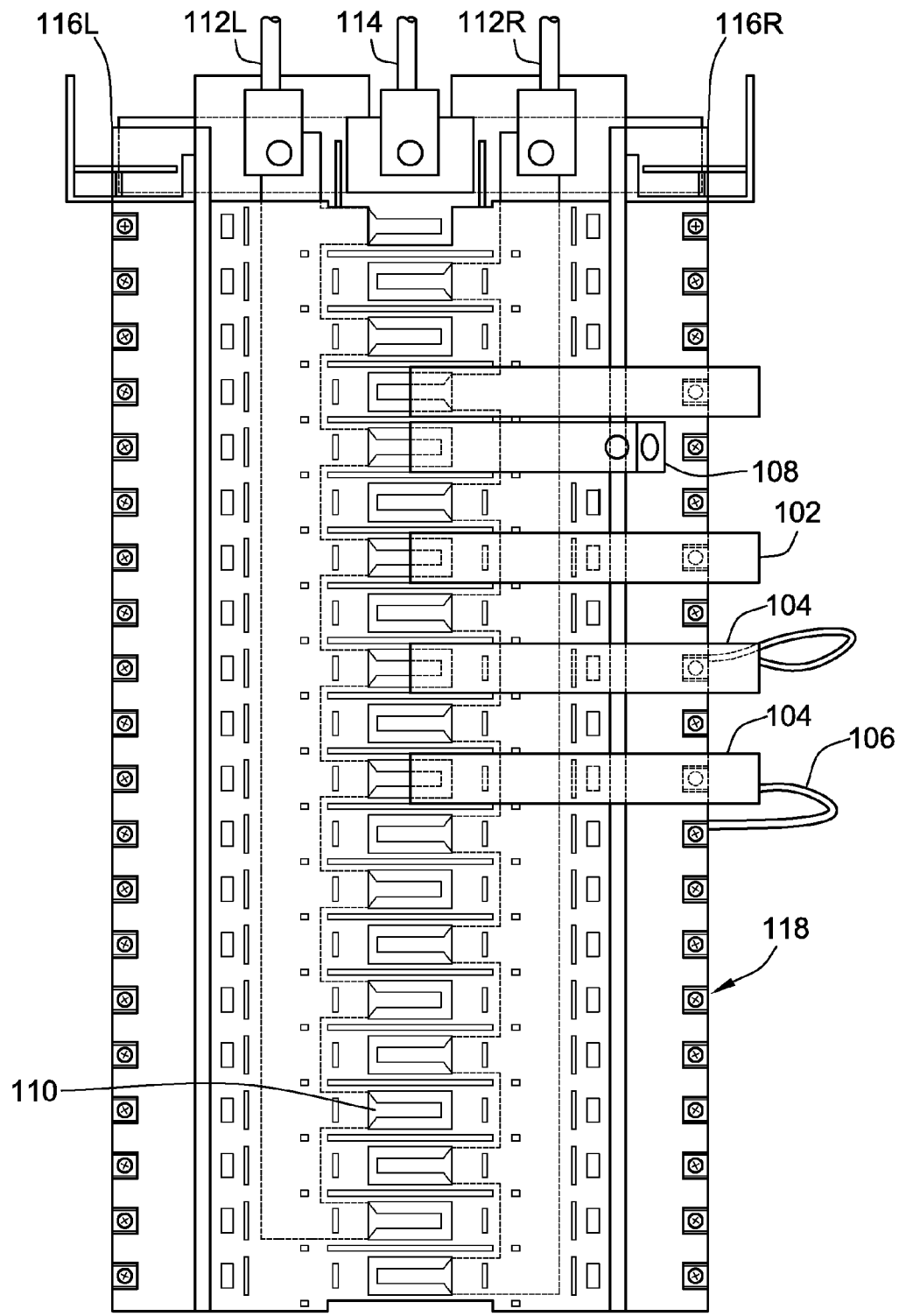
FIG. 1 is a front view of an electrical distribution panel with two installed neutral bus bars on left and right sides of the panel and circuit breakers connected to the bus bars.

Referring now to FIG. 1, a front view is shown of an interior of an electrical distribution panel or loadcenter 100 (such as Square D HOM brand from Schneider Electric) and installed neutral bus bars 116L,R (collectively 116, where L refers to a left side of the panel 100 and R refers to a right side of the panel 100). The terms panel or loadcenter are used interchangeably herein. The loadcenter 100 is arranged to receive side-by-side circuit breakers in two parallel rows on left and right sides of the loadcenter 100. In a center section of the loadcenter 100, panel connectors 110 engage corresponding conventional plug-on line jaw connectors (not shown) of each of the circuit breakers and connect the circuit breakers to a line current that is carried through first and second lines 112L,R (collectively, 112). In the illustrated embodiment, the panel connectors 110 electrically engage either the first line 112L, or the second line 112R. Fewer or more lines can be used. One neutral bus bar 116R is provided along a right-hand side (from the perspective of an observer looking at the front of the loadcenter 100) of the interior of the panel or loadcenter 100. A second neutral bus bar 116L is provided along a left-hand side of the interior of the electrical distribution panel or loadcenter 100. The neutral bus bars 116 are made of an electrically conductive material, such as aluminum, and are electrically engaged with a line-side neutral 114. "Line-side" refers to circuits and connections upstream of the circuit breakers toward the source of line current, as opposed to load-side, which refers to circuits and connections downstream of the circuit breakers toward the load(s) being protected by the circuit breakers. Each of the neutral bus bars 116 is provided with multiple wire-capture apparatuses 118, as further explained below.

Aspects of the present disclosure advantageously allow circuit breakers of various types to be installed into the loadcenter 100. For example, the circuit breakers can include any combination of a plug-on-neutral circuit breaker 102, a pigtail-neutral circuit breaker 104, or a non-fault-interrupting circuit breaker 108. Put differently, some circuit breakers can have a wire (called a pigtail due to its curly configuration) that must be manually fastened to a neutral bus bar 116 within the loadcenter 100 to connect the circuit breaker to the line-side neutral 114. Such circuit breakers bearing a wire for their neutral connection may or may not have a plug-on neutral connector in the form of a protruding mounting jaw. In pigtail-neutral circuit breakers having a plug-on mounting jaw, the mounting jaw can be made of a non-electrically conductive material such as plastic or can simply be disconnected from any protection circuits or mechanisms within the circuit breaker. Alternately, other circuit breakers can have an electrically conductive mounting jaw that electrically connects the circuit breaker to the neutral bus bar 116 and thereby to the line-side neutral 114. Advantageously, regardless of the type of circuit breaker, only one neutral bus bar made of a unitary piece is needed to reliably accommodate both pigtail connections and mounting jaw connections with a minimum amount of material that can lead to a reduction in the size of the loadcenter 100 and a reduction in the bending radiuses needed to accommodate the gauging of the wires used to couple the circuit breakers to the line-side and load-side connections (as discussed in more detail below with reference to FIGS. 5 and 6).

A plug-on-neutral circuit breaker 102 is provided with a mounting connector (also called a mounting jaw because of its resemblance to an open jaw) 224 (shown in FIG. 2A) that physically engages the neutral bus bar 116 as will be described in greater detail in connection with FIG. 2A. The mounting connector 224 of the plug-on neutral circuit breaker 102 also electrically connects the plug-on neutral circuit breaker 102 to the neutral bus bar 116 as will be discussed in more detail below in connection with FIGS. 4.

Figure 2A:
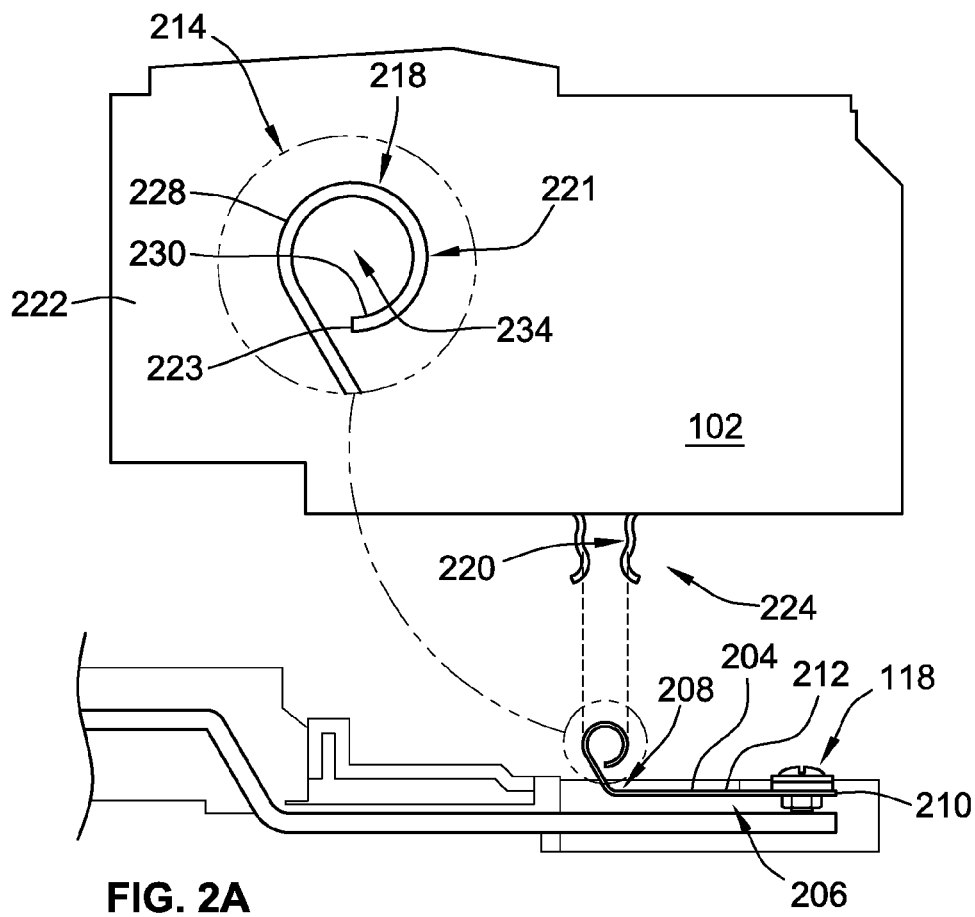
FIG. 2A is an end view of a portion of the electrical distribution panel with the circuit breakers of FIG. 1 uninstalled, showing one circuit breaker in a position prior to installation.

A pigtail-neutral circuit breaker 104 can be provided with a "dummy" mounting connector or jaw, shaped like the mounting connector 224 shown in FIG. 2A, and a wire 106. The terms pigtail-neutral circuit breaker and wire-neutral circuit breaker may be used interchangeably to refer to the pigtail-neutral circuit breaker 104. By "dummy" it is meant that the mounting connector does not functionally serve to connect the circuit breaker 104 to the line-side neutral 114, and can be made of plastic or other non-electrically conducting material. Rather it serves to secure and position the circuit breaker 104 to the neutral bus bar 116 alongside other circuit breakers installed on the neutral bus bar 116. The mounting connector of the pigtail-neutral circuit breaker 104 physically engages the neutral bus bar 116, but does not actually make any electrical connection with the neutral bus bar 116 inside the circuit breaker 104. Instead, the pigtail-neutral circuit breaker 104 is electrically coupled to the neutral bus bar 116 by the wire 106. The wire 106 is electrically coupled to the pigtail-neutral circuit breaker 104 to form a neutral connection external to the circuit breaker 104. The wire 106 is also electrically connected to one of the wire-capture apparatuses 118. Like its name connotes, each of the wire-capture apparatuses 118 captures securely a wire from a circuit breaker, such as the pigtail-neutral circuit breaker 104, to connect the circuit breaker physically and electrically to the neutral bus bar 116 and thereby to the line-side neutral 114.

A non-fault-interrupting circuit breaker 108 can be provided with a "dummy" mounting connector, also shaped like the mounting connector 224 shown in FIG. 2A, which physically (but not electrically) engages the neutral bus bar 116. The non-fault-interrupting circuit breaker 108 does not need and is not provided with an electrical connection to the neutral bus bar 116. Other conventional structures of the loadcenter 100 can include a trip unit, lug connections, etc., none of which is pertinent to an understanding of the present invention.

Referring now to FIG. 2A, an end view is shown of a portion of the electrical distribution panel showing just the plug-on neutral circuit breaker 102 for ease of illustration. In this example, the mounting connector 224 of the circuit breaker 102 protrudes downward (opposite a conventional handle (not shown) of the circuit breaker 102) away from a body or housing 222 of the circuit breaker 102. The mounting connector 224 can be formed in the manner of a pair of opposing clips that together form a jaw and plug onto portions of a rounded exterior surface 228 of a rolled rail 214. Other suitable or conventional mounting connectors and configurations can be used instead. Regardless of whether the mounting connector 224 is a "live" or "dummy" connector, the rolled rail 214 can receive any mounting connector of any type of circuit breaker.

The neutral bus bar 116R includes a rolled rail 214 having a first edge 223 and an extension 204 (the following description applies equally to the neutral bus bar 116L, so for convenience, the neutral bus bar will be referred to generally as the neutral bus bar 116). Wire-capture apparatuses 118 are shown installed with the neutral bus bar 116. The extension 204 includes a transition portion 208, a second edge 210 opposite the first edge 223, and a major surface 212 between the transition portion 208 and the second edge 210. The major surface 212 corresponds to the flat, contiguous surface area of the neutral bus bar 116. The rolled rail 214 protrudes from the transition portion 208 of the extension 204 such that the rolled rail 214 is located on a plane that is distinct from a plane in which the flat extension (e.g., a conductive plate) 204 lies. The angle of protrusion is preferably an obtuse angle relative to the major surface 212, but any suitable angle that allows the rolled rail 214 to engage the downwardly facing mounting connector 224 of a circuit breaker can be used, so long as the ends of the jaws are not impeded by contact with the extension 204. The wire-capture apparatuses 118 are located at the edge 210, as can also be seen in FIG. 3, described in more detail below.

As shown in FIG. 2A, the rolled rail 214 can extend at an oblique angle (relative to the major surface 212) away from the transition portion 208 of the extension 204. The rolled rail 214 can be any of a number of shapes and can be solid or hollow, so long as the rolled rail 214 is shaped and configured to receive securely the jaws of the mounting connector 224 of a circuit breaker. The rolled rail 214 has an exterior surface 228 and an interior surface 230. The exterior surface 228 includes at least one area of physical engagement 221 and a generally rounded top surface 218. The interior surface 230 defines a channel 232 therein, which extends along an axis A shown in FIG. 3, and terminates at the first edge 223, leaving a slight gap between the first edge 223 and the rest of the rolled rail 214. This gap allows for ease of manufacturing and facilitates heat conduction away from the neutral bus bar, but can be sealed or closed to form a closed channel.

Figure 2B:
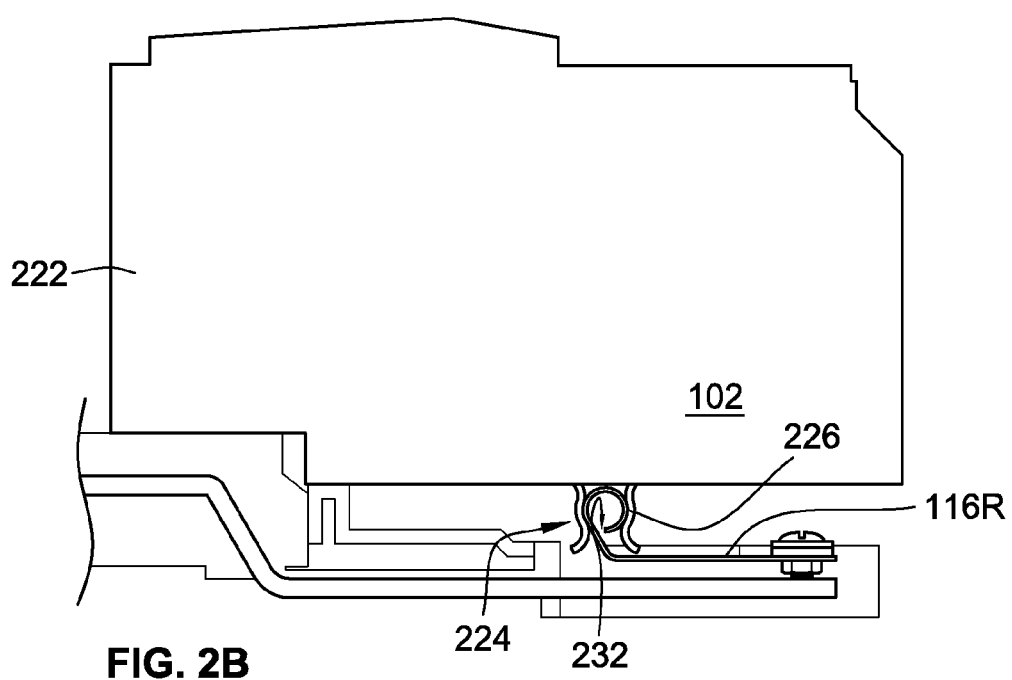
FIG. 2B is an end view of a portion of the electrical distribution panel with one of the circuit breakers of FIG. 1 installed to show the connection between the mounting jaw of the circuit breaker onto the rolled rail of the neutral bus bar shown in FIG. 2A.

FIG. 2B shows the jaws of the mounting connector 224 of the circuit breaker 102 physically engaged with the rolled rail 214. When engaged, the mounting connector 224 and rolled rail 214 have at least one point of contact 226. A point or area of contact can occur at any location along the areas of physical engagement 220, 221. The jaws of the mounting connector 224 can have a curved shape to mate with a corresponding curved profile of the curved side 221 of the rolled rail 214. The areas of physical engagement 220, 221 can be varied in both number and size depending upon the type of rolled rail 214 and mounting connector 224 used. If the mounting connector 224 also serves as the plug-on neutral connection, the physical engagement of the mounting connector 224 to the rolled rail 214 electrically couples the neutral bus bar 206 with the plug-on-neutral circuit breaker 102. In aspects where the mounting connector 224 is a "dummy" connector, the rolled rail 214 simply serves to maintain the circuit breaker, such as the circuit breaker 108, in physical alignment and engagement on the rolled rail 214 within the loadcenter 100.

Figure 3:
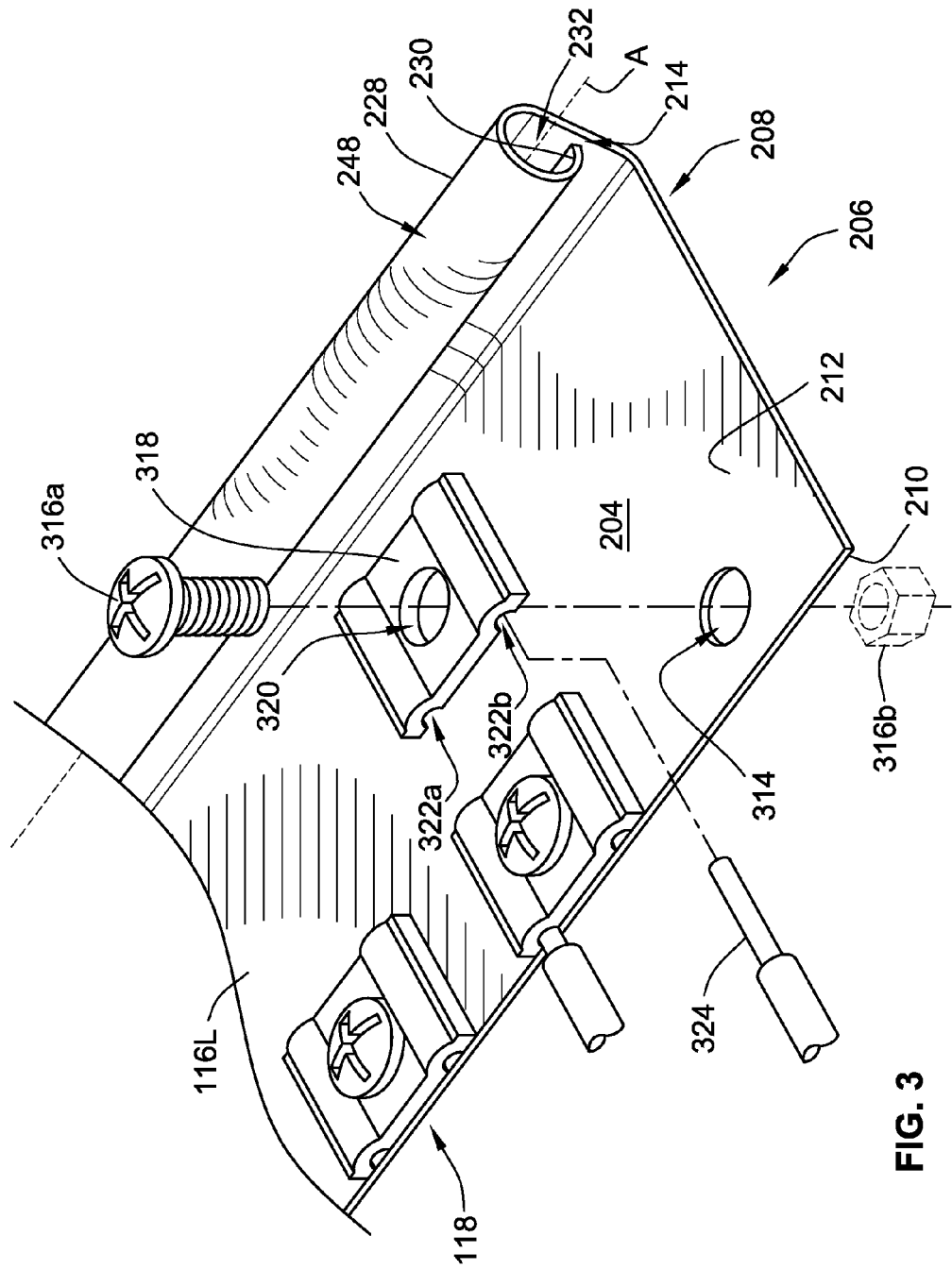
FIG. 3 is a perspective view of a neutral bus bar used in FIG. 1.

Referring now to FIG. 3, the neutral bus bar 116L (for ease of illustration, only one of the two neutral bus bars 116L,R is shown in FIG. 3, but the following discussion applies equally to either of the neutral bus bars) is shown in perspective view. The rolled rail 214 has an open end 232, an exterior surface 228 and an interior surface 230. The interior surface 230 defines a channel 232 therein that runs along the axis A. The extension 204 has a major surface 212, which in this illustration is generally flat and rectangular in shape. The extension 204 has multiple wire-capture apparatus locations (represented by wire-capture apparatuses 118 and aperture 314) at the second edge 210. In this illustrated example, the apertures 314 are equally spaced in a line along the second edge 210 of the extension 204. In another implementation, the apertures 314 can be arranged in a staggered fashion along the second edge 210 instead of being mutually co-aligned along a line along the second edge 210. The wire-capture apparatus 118 shown in FIG. 3 includes a compression plate 318 and a fastener 316a,b. The compression plate 318 has a plate aperture 320 and a pair of wire channels 322a,b. A bolt 316a is received through the plate aperture 320 and the aperture 314, which are aligned together. The nut 316b or the aperture 314 or both can be threaded to receive a corresponding thread on the bolt 316a. The nut 316b can be attached to the neutral bus bar and aligned with aperture 314 to secure the compression plate 318 by the bolt 316a. A wire 324 is inserted into one of the channels 322a,b, and the bolt 316a is tightened down to physically secure the wire 324 within the channel 322a and to electrically engage the wire 324 with the neutral bus bar 116L. The compression plate 318 and the fastener 316a,b are electrically conductive. A person of ordinary skill in the art will recognize that other wire-capture devices and orientations may also be used to secure wire connections to the neutral bus bar 116L.

Referring now to FIG. 4, an end view of the electrical distribution panel 100 of FIG. 1 illustrates an electrical connection between the neutral bus bars 116L,R and the line-side neutral 114. A neutral conductor 402 is shown electrically engaging the neutral bus bars 116L,R with the line-side neutral 114. Metal fasteners, such as pins, bolts, screws, or the like, physically and electrically couple the neutral bus bars 116L,R to the neutral conductor 402.

Alternately, a shorting strap or similar conductive apparatus can be used to physically and electrically connect the neutral conductor 402 to each of the neutral bus bars 116L,R. The neutral conductor 402 is kept electrically isolated from the first and second lines 112L,R carrying line-side current by appropriately placed dielectrics 430L,R inserted between the conductive line-side connections corresponding to the first and second lines 112L,R and the neutral bus bars 116L,R.

Figure 6:
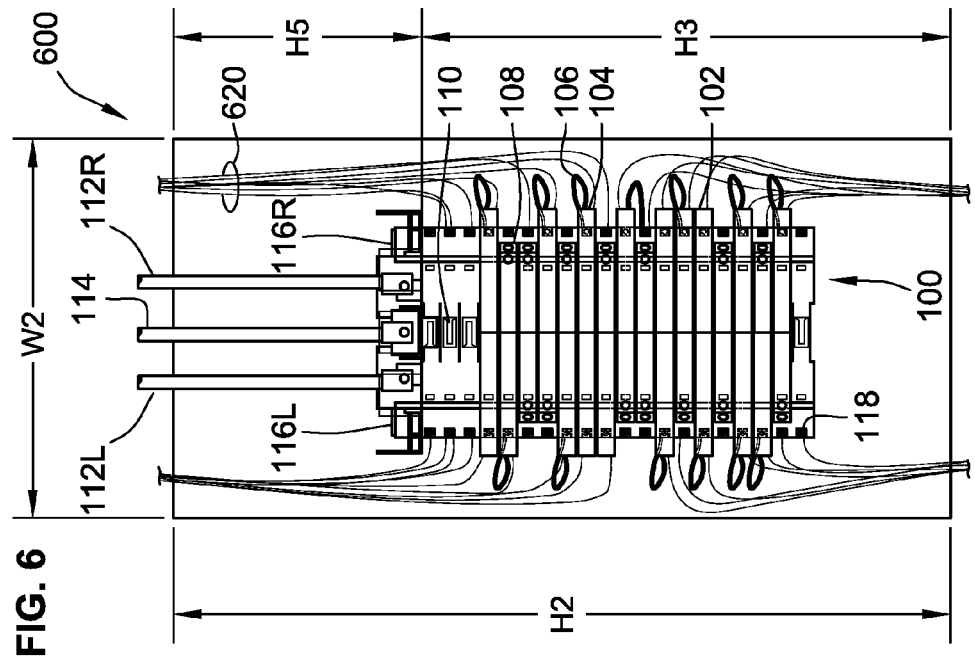
FIG. 6 is a front view of an electrical distribution panel in accord with an aspect of the present disclosure, shown with circuit breakers and load-side neutral wires installed and the attendant reduction in height and width of the panel compared to the panel shown in FIG. 5.
Figure 5:
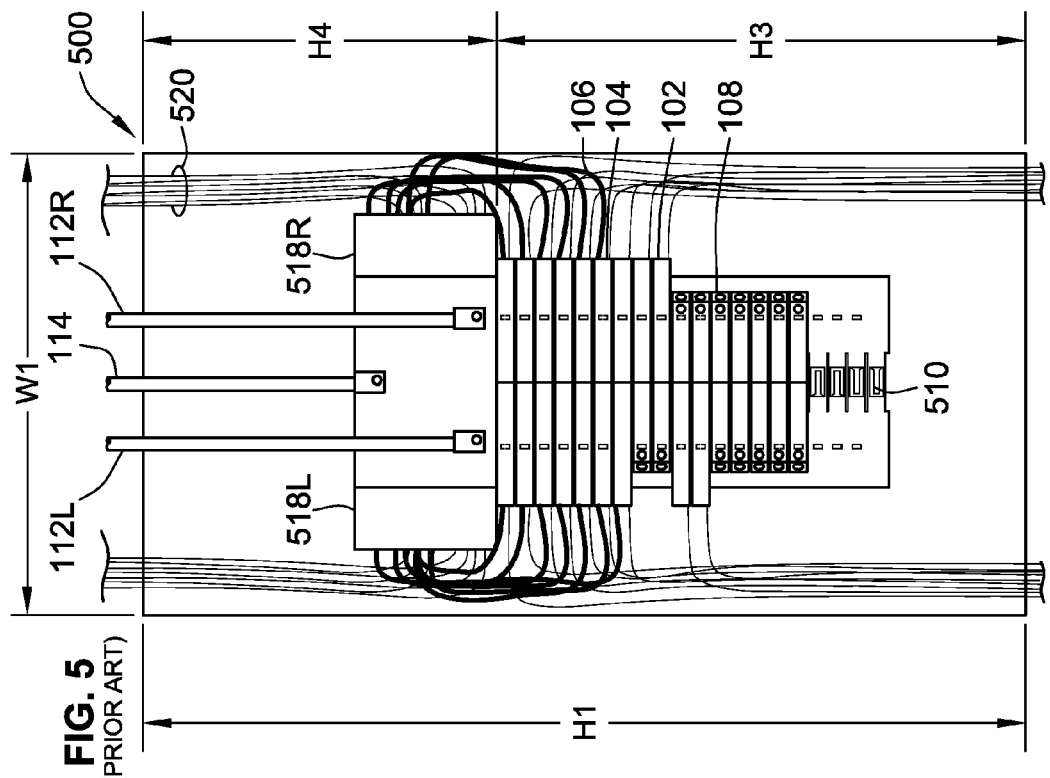
FIG. 5 is a front view of a prior-art electrical distribution panel shown with circuit breakers and load-side neutral wires installed.

Referring to FIG. 5, a prior-art electrical distribution panel 500 is shown with various circuit breakers 102, 104, 108 installed and corresponding load-side neutral wires 520 connecting the circuit breakers 102, 104, 108 to respective loads. The pigtail-neutral circuit breakers 104 have a wire 106 connected between the breaker 104 and a neutral bus block 518. This conventional configuration undesirably leads to increased wire clutter in the gutter of the electrical distribution panel 500. Further, all wire connections to the load-side neutral 514 are made in a confined space at the neutral bus block 518. Due to bending radii associated with the gauge of the wires, a minimum amount of space is required to accommodate the bends in the wires because they cannot be folded at right angles. This causes both wiring and rewiring the electrical distribution panel 500 to be much more complex than with the present invention. Moreover, as can be seen in FIG. 6, the width W2 of the loadcenter 100 is narrower than the width W1 of the prior-art panel 500. Further, elimination of the neutral bus block in the present disclosure allows the overall height of the electrical distribution box 500 to be decreased from H1 (shown in FIGS. 5) to H2 (shown in FIG. 6), due to a reduction in height from H4 down to H5 starting at the topmost location of an installed circuit breaker in the panel.

Referring now to FIG. 6, a front view of an electrical distribution panel 600 in accord with the present invention is shown with circuit breakers 102, 104, 108 and load-side neutral wires 620 installed. As is shown, the circuit breakers 102, 104, 108 can be installed at any available location. The use of pigtail-neutral circuit breakers 604 does not appreciably add clutter or congestion to the wire gutter compared to the prior-art panel 500 shown in FIGS. 5 because the line-side neutral wires 106 can be attached to the closest wire-capture apparatus 118 on the neutral bus bar 116.

Advantageously, the use of a unitary neutral bus bar 116 of the present disclosure allows for the width of the electrical distribution panel 600 to be decreased compared to prior-art panels 500. Electrical wiring codes require a minimum amount of bending space between a wire connection point and an obstruction such as a wall of the electrical distribution panel. As shown in FIG. 5, the neutral bus block 518 occupies a wider space than the circuit breakers. This makes the width of the panel 500, W1, larger than simply the width of the circuit breakers plus the required bending space from the end of the breaker. As can be seen in FIG. 6, the minimum width W2 of the electrical distribution panel is determined by the width of the circuit breakers plus the required bending space, such that W2 is less than W1.

Figure 7:
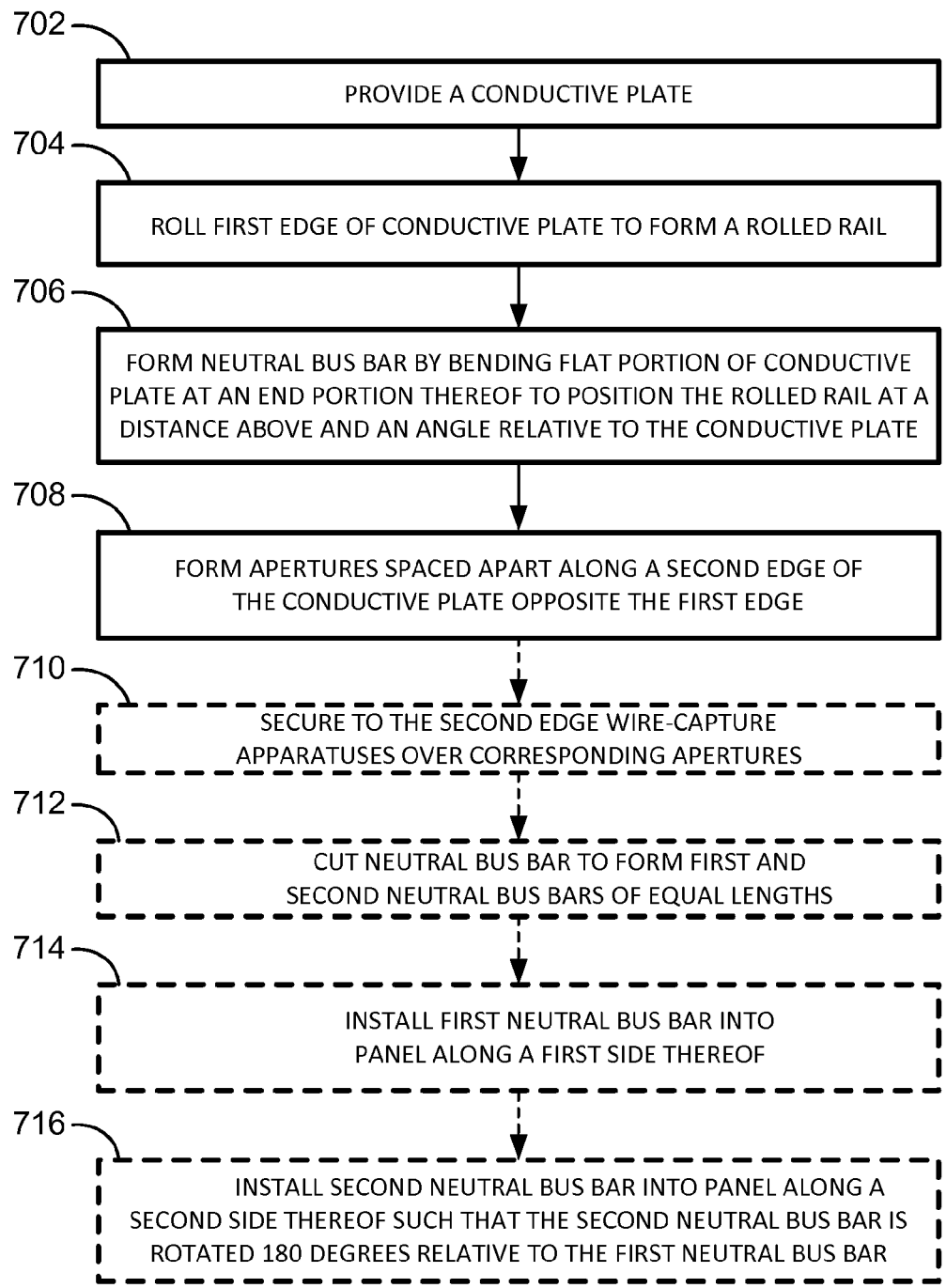
FIG. 7 is a flowchart diagram of a method or process of forming a neutral bus bar together with wire-capture apparatuses according to an aspect of the present disclosure.

Referring now to FIG. 7, a method for assembly is illustrated. A conductive plate is provided (702), such as a metal plate having a rectangular shape. A first edge 223 of the conductive plate is rolled to form a rolled rail 214 configured to engage a mounting connector 224 of a circuit breaker, such as the circuit breaker 102 (704). While it is not as critical that the top of the rolled rail 214 remain rounded or curved, the sides of the rolled rail 214 should conform to the shape or profile of the jaws of the mounting connector 224, which can be curved or bowed. Thus, the present disclosure contemplates flattening the top surface of the rolled rail 214 where the mounting connector 224 does not physically engage once installed over the rolled rail 214. A neutral bus bar 116 is formed by bending the flat portion of the conductive plate at a transition portion (such as the transition portion 208 shown in FIG. 2A) thereof to position the rolled rail 214 at a distance above and at an angle relative to the conductive plate (706). An example of this orientation can be seen in FIG. 2A, where as described above, the rolled rail 214 is bent at an oblique angle relative to the major surface 212 and protrudes a distance away from the major surface 212 to accommodate the downwardly facing jaws of the mounting connector 224 of an installed circuit breaker, such as the circuit breaker 102. Spaced-apart apertures are formed along a second edge 210 of the rolled rail 214 opposite the first edge 223 to accommodate wire-capture apparatuses 118 (708).

Optionally, wire-capture apparatuses 118 can be secured along the second edge 210 of the neutral bus bar 116 over the corresponding apertures 314 (710). The neutral bus bar 116 can be cut to form a first neutral bus bar 116L and a second neutral bus bar 116R of equal lengths (712). The first neutral bus bar 116L can be installed into a panel 100 along a first side (e.g., a left side) thereof (714), and the second neutral bus bar 116R can be installed into the panel 100 along a right side thereof (716) by rotating the second neutral bus bar 116R 180 degrees relative to the first neutral bus bar 116L (716). In this manner, long lengths of a conductive plate can be formed into a rolled rail, and then cut into equal lengths to forms both left- and right-side bus bars to be installed into a panel 100. One manufacturing process can produce single-piece neutral bus bars that can be installed on either side of the panel 100 with a relatively few number of fabrication steps (rolling, bending, forming apertures, and cutting).

The method of manufacture shown in FIG. 7 decreases costs for production of the distribution panel 100 because only simple fabrication steps need to be taken that are quickly and easily performed. The use of a unitary neutral bus can reduce the number of pieces used to construct electrical distribution panels 100, 600. For example, a single piece of aluminum can be used to form the neutral bus bar 616. The rolled rail 214 (shown in FIG. 3) can be rolled from an initial conductive plate using a minimum amount of material. In an aspect, the unitary neutral bus bar can be formed using a 0.03 inch thick aluminum sheet. Further, the use of a continuous rolled rail 310 reduces current crowding along the rolled rail 214 to produce a more uniform heat and current distribution along the neutral bus bar 214.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An electrical distribution apparatus adapted to receive either of
    a first circuit breaker having a plug-on neutral connector for connection to a line-side neutral or
    a second circuit breaker having a wire for connection to the line-side neutral; and having:
    a plurality of panel connectors connecting the first circuit breaker and the second circuit breaker to an electrical line current;
    a first neutral bus bar operatively connected to the line-side neutral, the first neutral bus bar being a unitary piece having a rolled rail and an extension, the extension having a major surface between the rolled rail and an edge of the neutral bus bar, the rolled rail protruding from the extension at an angle away from the major surface; and
    a plurality of wire-capture apparatuses located at the edge, each configured to receive from the second current breaker the wire carrying neutral current,
    wherein the rolled rail includes generally rounded sides configured to physically engage the plug-on neutral connector of the first circuit breaker and to electrically connect the plug-on neutral connector to the line-side neutral, and wherein the wire of the second circuit breaker electrically connects to one of the plurality of wire-capture apparatuses, thereby electrically connecting the second circuit breaker to the line-side neutral.

2. The electrical distribution apparatus of claim 1 wherein the major surface is flat and wherein the angle is an oblique angle relative to the major surface.

3. The electrical distribution apparatus of claim 1 wherein the rolled rail is rolled to form an exterior and an interior surface, the exterior surface is generally rounded, and the interior surface defines a channel.

4. The electrical distribution apparatus of claim 3 wherein the generally rounded exterior surface forms a curve extending at least 180° about an axis extending through the channel and terminates at an open end.

5. The electrical distribution apparatus of claim 1 wherein each of the wire-capture apparatuses include a compression connection for compressing a wire captured within a channel of the wire-capture apparatus or a wire-capture nut for receiving a fastener for securing a wire to the first neutral bus bar.

6. The apparatus of claim 1 further comprising a second neutral bus bar operatively connected to a line neutral, the second neutral bus bar being a unitary piece having a rolled rail and an extension, the extension of the second neutral bus bar having a major surface between the rolled rail of the second neutral bus bar and an edge of the second neutral bus bar, the rolled rail of the second neutral bus bar protruding from the extension of the second neutral bus bar at an angle away from the major surface of the second neutral bus bar, and a plurality of wire-capture apparatuses located at the edge of the second neutral bus bar, wherein the second neutral bus bar is situated on an opposite side of an interior of the panel from the first neutral bus bar such that the extension of the first neutral bus bar points away from the extension of the second neutral bus bar.

7. A neutral bus bar for use within an electrical distribution apparatus, comprising:
    a rolled rail;
    an extension having an edge, and a transition portion opposite the edge and a major surface therebetween, the rolled rail protruding from the transition portion at an angle away from the major surface; and
    a plurality of apertures positioned along the edge of the extension,
    wherein the rolled rail is configured to physically engage a plug-on neutral connector of a first circuit breaker and electrically connect the plug-on neutral connector to a line-side neutral current carried through the neutral bus bar.

8. The neutral bus bar of claim 7 in combination with a plurality of plates and fasteners, each of the plates and fasteners being associated with respective ones of the apertures, wherein each of the plates is configured to receive from a circuit breaker a wire carrying neutral current within a wire channel formed by the plate, and wherein the major surface is substantially flat.

9. The neutral bus bar of claim 7 in combination with a plurality of wire-capture apparatuses, wherein the apertures are spaced equally from one another in a line along the edge of the extension and each of the wire-capture apparatuses is configured to be secured to the extension over corresponding ones of the apertures.

10. The neutral bus bar of claim 9 wherein the plug-on neutral connector of the first circuit breaker includes a mounting jaw, and wherein the rolled rail includes generally rounded sides configured to physically engage the mounting jaw and electrically connect the mounting jaw to the line-side neutral current.

11. The neutral bus bar of claim 10 wherein the rolled rail includes a generally rounded top surface to form a curved surface extending at least 180 degrees about an axis defined by a channel extending along an interior surface of the rolled rail.

12. The neutral bus bar of claim 7 wherein the rolled rail is rolled to form an exterior surface and an interior surface, the interior surface defining a channel extending along the rolled rail.

13. The neutral bus bar of claim 12 wherein the rolled rail forms a curved surface extending at least 270° about an axis extending along the channel and terminates at an open end.

14. An assembly method comprising:
providing a conductive plate;
rolling a first edge of the conductive plate to form a rolled rail configured to engage a mounting jaw of a circuit breaker;
bending a flat portion of the conductive plate at an end portion of the conductive plate to position the rolled rail at a distance above and an angle relative to the conductive plate such that the rolled rail is located on a plane distinct from a plane in which the conductive plate lies, to form a neutral bus bar; and
forming a plurality of apertures spaced apart along a second edge of the conductive plate opposite the first edge.

15. The method of claim 14, further comprising securing to the second edge over corresponding ones of the apertures a plurality of wire-capture apparatuses configured to securely capture a wire from a second circuit breaker to electrically connect the wire to the neutral bus bar.

16. The method of claim 14 wherein the rolled rail includes a generally rounded top surface, rounded sides, and an interior surface defining a channel extending along the rolled end, the rounded sides being configured to physically engage with the mounting jaw responsive to the circuit breaker being installed on the neutral bus bar.

17. The method of claim 14 wherein the generally rounded top surface forms an arc of at least 180° and terminates at an open end.

18. The method of claim 14 further comprising:
cutting the neutral bus bar to produce a first neutral bus bar and a second neutral bus bar of equal lengths;
installing the first neutral bus bar into an electrical distribution apparatus along a first side thereof; and
installing the second neutral bus bar into the electrical distribution apparatus along a second side thereof opposite the first side such that the second neutral bus bar is rotated 180 degrees relative to the first neutral bus bar.

19. The method of claim 18, further comprising securing to the second edge of the second neutral bus bar over corresponding ones of the apertures formed in the second neutral bus bar a plurality of wire-capture apparatuses configured to securely capture a wire from a second circuit breaker to electrically connect the wire to the second neutral bus bar.

\* \* \* \* \*